United States Patent [19]

Schwerin et al.

[11] 3,902,527

[45] Sept. 2, 1975

[54] ELECTROMAGNETICALLY ACTUATABLE MULTIPATH VALVE

[75] Inventors: Inge Schwerin, Moglingen; Josef Trui, Bissingen, both of Germany

[73] Assignee: Robert Bosch GmbH, Stuttgart, Germany

[22] Filed: Jan. 17, 1974

[21] Appl. No.: 434,276

[30] Foreign Application Priority Data
Feb. 2, 1973 Germany.............................. 2305124

[52] U.S. Cl. .......................................... 137/625.65
[51] Int. Cl. ....................... F16k 11/02; F16k 31/02
[58] Field of Search..... 137/625.65, 625.64, 596.17, 137/596.16; 251/129

[56] References Cited
UNITED STATES PATENTS

| | | |
|---|---|---|
| 2,826,215 | 3/1958 | Wolfslau et al................. 251/129 X |
| 3,529,620 | 9/1970 | Leiber......................... 137/625.65 X |
| 3,570,807 | 3/1971 | Sturman.......................... 251/129 X |
| 3,774,642 | 11/1973 | Gray............................. 137/625.65 |

Primary Examiner—Arnold Rosenthal
Attorney, Agent, or Firm—Edwin E. Greigg

[57] ABSTRACT

An electromagnetically actuatable, multipath, seating valve for an air pressure system includes a housing. A magnetic core having a central bore is fixed to the housing. A pair of membrane springs are provided. An armature is carried substantially free of friction by the pair of membrane springs. The armature has a central carrier rod which extends through the central bore in the magnetic core in spaced relationship to the inner surface of the bore. Outlet air is guided to the outside through the central bore.

6 Claims, 1 Drawing Figure

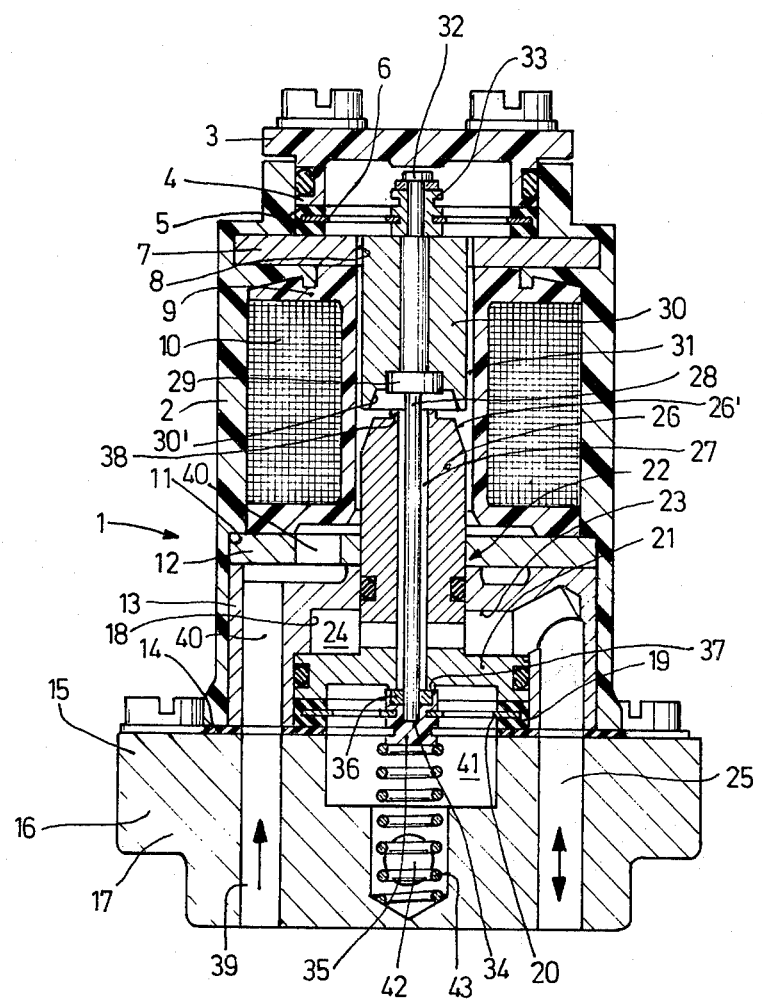

ELECTROMAGNETICALLY ACTUATABLE MULTIPATH VALVE

BACKGROUND OF THE INVENTION

This invention relates to an electromagnetically actuatable, multipath, seating valve for an air pressure system. The invention relates, more particularly, to an electromagnetically actuatable, multipath, seating valve for an air pressure system, especially for a pressurized air braking system of a braking lock prevention mechanism of a motor vehicle. The valve has an armature with a central carrier rod, guided without friction by two membrane springs, and a core, fixed to a housing, the core being penetrated by the carrier rod and radial space being provided between the carrier rod and the inner surface of the core.

A multipath valve of this kind is known from the patent to Nickells U.S. Pat. No. 2,922,614, issued Jan. 26, 1960. This known valve is a 2/2-way valve and the air pressure is passed over the outside of the winding of its electromagnet. When valves of this kind are used for controlling three ways, the exhaust air is ordinarily let out, through an annular gap or slit between the armature and an armature guide tube, to the outside air. Such a valve is disclosed in Published German Patent Specification No. 1,600,798. This pathway for the exhaust air has the disadvantages, however, that dirt particles carried along by the pressurized air impede the armature motion or again that the armature seizes due to the freezing of water carried in the pressurized air. In this case the electromagnetic valve, and consequently the lock prevention mechanism, fails to function. In order to avoid the failure, it is necessary in known magnetic valves of this kind, that the annular gap be relatively large, which in turn has the undesirable effect of reducing the force of the magnet.

SUMMARY OF THE INVENTION

It is an object of the present invention to provide an electromagnetically actuatable, multipath valve which is free of the disadvantage of dirt particles carried in the pressurized air impeding or seizing its armature.

It is another object of the present invention to provide an electromagnetically actuatable, multipath valve which is free of the disadvantage of its armature being seized due to freezing of water carried in the pressurized air.

It is a further object of the present invention to provide an electromagnetically actuatable, multipath valve which does not require a large annular gap in its magnetic circuit which otherwise would reduce the force produced by the magnet.

The foregoing objects, as well as others which are to become clear from the text which follows, are achieved according to the present invention by providing an electromagnetically actuatable, multipath valve for an air pressure system which includes a housing and a magnetic core fixed to the housing, the magnetic core having a central bore therein. An armature having a central carrier rod is provided. The armature is carried, substantially free of friction, by a pair of membrane springs. The central carrier rod extends through the central bore in spaced relationship to its inner surface. Outlet (exhaust) air is guided outside through the central bore.

It is a salient feature of the present invention that the outlet air is guided to the outside through the central bore of the core which accepts the carrier rod, space being provided between the carrier rod and the inner surface of the bore.

In a preferred embodiment according to the present invention, the carrier rod of the multipath valve carries a valve closing member of the inlet valve section, at least the valve closing member being made of non-magnetic material.

In a particularly preferred embodiment according to the present invention, the carrier rod as well as the closing member of the inlet valve section are formed by a single piece made of non-magnetic material.

A multipath valve according to one embodiment of the present invention includes a flange on the carrier rod, which flange acts as a valve closing member of the inlet valve section, this flange being embedded in the armature of the multipath valve and both valve seats being made of metallic material.

A multipath valve according to a further embodiment of the present invention includes a core positioned vertically with respect to the armature, the armature being above the core, the upper portion of the core being provided with an external conical bevel, and a portion of the armature, which lies opposite the external bevel, being formed as an interior conical bevel of corresponding size and shape.

A multipath valve according to an additional embodiment of the present invention includes a core facing away from the armature, the core being provided with a metallic valve seat for the outlet valve section and a closing member of the outlet valve section made of an elastic material being fastened on the carrier rod.

BRIEF DESCRIPTION OF THE DRAWING

The sole FIGURE of drawing is a vertical cross-sectional view of an electromagnetically actuatable, multipath, seating valve for an air pressure system according to the present invention.

DETAILED DESCRIPTION OF THE PREFERRED EMBODIMENTS

Referring to the drawing, an electromagnetically actuatable, multipath seating valve according to the present invention has a housing 1 consisting of several parts. A top member 2 of the housing 1 is embodied as a hollow cylinder. The top member 2 is hermetically pressure sealed by a lid 3 which has an inner shoulder 4 by means of whose face an outer ring 5 of the membrane spring 6 is pressed against an intermediate wall 7. The membrane spring 6 is a circular leaf spring having circular cutouts (not shown) which define a middle region which may move elastically in the axial direction, with respect to the outer region of the membrane spring 6. The outer region of the membrane spring 6 is fixedly held in tension. The intermediate wall 7 is fastened in the outer wall of the top member 2 by material deformation in a conventional fashion.

The intermediate wall 7 has a central aperture 8 whose diameter substantially corresponds to the inside diameter of a coil 9 carrying windings 10 of a magnet. A perforated intermediate plate 12 lies on a housing shoulder 11 of the top member 2, thereby holding the coil 9 pressed against the intermediate wall 7. The intermediate plate 12, in turn, is held in place on the housing shoulder 11 by an insert 13.

The lower faces of the upper housing member 2 and of the insert 13 lie in the same plane and are covered by a sealing disc 14 lying on a lower member 17 of the housing 1.

The insert 13 has a downwardly enlarging step-shaped, three-step recess 18. In that portion of the recess 18 having the largest diameter, an outer ring 19 of a further membrane spring 20 and a base 21 of a magnetic core 22 are located. The membrane spring 20 is constructed in the same manner as the membrane spring 6 as a circular leaf spring having circular cutouts (not shown) and functions in a similar manner. Between the top of the base 21 and a shoulder 23 of the insert 13, there is formed a pressure exchange chamber 24 which is in constant communication, through a channel 25, with a utilization device (not shown). An upper portion 26 of the magnetic core 22 extends above the insert 13, penetrates the intermediate plate 12 and extends into the coil 9 up to approximately one-half of its length.

The magnetic core 22 has an axial central penetrating bore 27 which receives a carrier rod 28. The bore 27 has a diameter substantially larger than the diameter of the carrier rod 28 so as to provide an annular space between the carrier rod 28 and the inner surface of the bore 27. The carrier rod 28 has a flange 29, the flange 29 being embedded in an armature 30. The armature 30 and the upper portion 26 of the magnetic core 22 have a smaller diameter than the inside wall of the coil 9 so that an annular gap 31 is formed, which gap may be relatively narrow.

An upper end 32 of the carrier rod 28 is fastened to the central region of membrane spring 6 by means of a fastening member 33. A lower end 34 of the carrier rod 28 is fastened in the central region of the membrane spring 20 by a fastening member 35. The fastening member 35 carries a valve closing member 36 made of elastic material which is intended for cooperation with a valve seat 37 disposed at the lower side of the base 21 of the magnetic core 22. The valve closing member 36 and the valve seat 37 form an outlet valve section. The upper end of the upper portion 26 of the magnetic core 22 facing toward the armature 30, is provided with a valve seat 38 intended for cooperation with a lower plane surface of the flange 29 of carrier rod 28. The flange 29 and the valve seat 38 form an inlet valve section. Both valve seating surfaces are therefore metallic.

Immediately adjacent to the valve seat 38 the magnetic upper portion 26 of the magnetic core 22 is provided with an external, upwardly facing, conical bevel 26'. An internal, downwardly facing, conical bevel 30' of corresponding size and complementary shape lies opposite the external, conical bevel 26', the bevel 30' being formed in the armature 30.

An inlet channel 39 for pressurized air to be controlled by the magnetic valve leads, via an axial bore 40 in the insert 13 and further through the intermediate plate 12, into the annular gap 31; an outside air connection is made by a space 41 lying beneath base 21 for the magnetic core 22 and by a channel 42 which communicates with the space 41. A spring 43 urges the armature 30 towards its upper position.

The carrier rod 28 and its flange 29, which is also the valve closing member 29 of the inlet valve section 29/38, are made of non-magnetic material. They are preferably made as a single, integral piece, but they can also be made of two pieces and, in that case, only the flange 29 need be made of nonmagnetic material.

The operation of the electromagnetically actuatable, multipath, seating valve described above is set out in detail below.

In the illustrated embodiment as shown, the magnetic coil 10 does not initially carry current and the armature 30 is located in an upper, final or rest position due to the force of the spring 43. The membrane springs 6 and 20 laterally position the armature 30 centrally by means of the carrier rod 28 so that the relatively narrow annular gap 31 is always maintained. Pressurized air coming from the inlet channel 39 flows through the axial bore 40, into the annular gap 31, further through the open inlet valve section 29/38, through the bore 37, along the carrier rod 28 and through the pressure exchange chamber 24, into the channel 25 and thence to the utilization device of the air pressure system, which may be the air braking system of a brake lock prevention mechanism for a motor vehicle.

When the coil 10 is energized, the core 26 attracts the armature 30. The inlet valve section 29/38 closes and the outlet valve section 36/37 opens. Now the pressurized air flows from the utilization device into the pressure exchange chamber 24, further through the bore 27 along the carrier rod 28, and thence through the open outlet valve 36/37 to the outside air. As a result, any dirt particles and the like contained in the outlet air do not reach the narrow annular gap 31, and any water, which may be carried along by the pressurized air, cannot cause the armature to freeze during freezing temperatures.

Furthermore, if the magnet is positioned substantially vertically, with the disposition of the armature 30 above the conical surfaces 26' and 30' of the upper portion 26 of the magnetic core 22 and of the armature 30, it is most likely that any water or at least substantial quantities of any water reaching the valve from the supply air is caught and deviated by the conical surfaces 26' and 30' in such a way that the water may possibly not even reach the utilization device, but may immediately return in the direction of the air inlet channel 39. For this reason, the multipath valve described is particularly suitable for the lock prevention of motor vehicle brakes where it is important that the brakes of the vehicle do not fail because of a seized or jammed armature in the multipath valve.

It is to be appreciated that the foregoing description relates to illustrative embodiments of the present invention of a valve and should not be considered to be limiting. Numerous variants and other embodiments are possible and come within the spirit and scope of the invention as defined in the appended claims.

What is claimed is:

1. An electromagnetically actuatable, multipath, 3/2-way, seating valve for an air pressure system having a working chamber comprising, in combination:
   a. housing means;
   b. a magnetic core fixed to said housing means, said magnetic core having a central bore therein which forms at least part of a passageway from the working chamber to the outside;
   c. an armature having a central carrier rod; and
   d. a pair of membrane springs, said armature being carried substantially free of friction by said pair of membrane springs, said central carrier rod extending through said central bore in spaced relationship to its inner surface and wherein outlet air is guided from said working chamber outside through said central bore.

2. A valve according to claim 1, further including a valve-closing member forming part of an inlet valve section, said valve-closing member being made of non-magnetic material and being carried by said central carrier rod.

3. A valve according to claim 1, further including a valve-closing member forming part of an inlet valve section, said valve-closing member being integral with said central carrier rod, and said valve-closing member and said central carrier rod being made of non-magnetic material.

4. A valve according to claim 1, further including a valve seat having a valve-sealing surface, and a flange, said flange constituting a valve-closing member of an inlet valve section and having a valve-sealing surface, said flange being a part of said central carrier rod and being embedded in said armature, and both of said sealing surfaces being metallic.

5. A valve according to claim 1, wherein said magnetic core comprises a magnet, said armature being positioned substantially vertically with respect to and above said magnetic core, an upper portion of said magnetic core having formed thereon an external, conical bevel, and a portion of said armature lying opposite said external, conical bevel having formed thereon an interior, conical bevel of corresponding size and complementary shape to said external bevel.

6. A valve according to claim 1, wherein said magnetic core comprises a magnet, said core, having an end facing away from said armature provided with a metallic valve seat forming part of an outlet valve section, and additionally including a valve-closing member, said valve-closing member being carried by said central carrier rod and being made of elastic material.

* * * * *